United States Patent
Kurczewski et al.

(10) Patent No.: US 11,124,233 B1
(45) Date of Patent: Sep. 21, 2021

(54) DRIVE TRAIN AND SUSPENSION FOR AN AUTONOMOUS GROUND VEHICLE

(71) Applicant: Amazon Technologies, Inc., Seattle, WA (US)

(72) Inventors: Nicolas Kurczewski, Seattle, WA (US); Ennio Claretti, Seattle, WA (US); Nicolas Hostein, Seattle, WA (US); Brett Skaloud, Seattle, WA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 16/215,320

(22) Filed: Dec. 10, 2018

(51) Int. Cl.
| | | |
|---|---|---|
| *B62D 11/04* | (2006.01) | |
| *B62D 61/10* | (2006.01) | |
| *B60G 9/02* | (2006.01) | |
| *B62D 11/00* | (2006.01) | |
| *B60C 3/04* | (2006.01) | |
| *B60C 11/03* | (2006.01) | |
| *B60G 17/016* | (2006.01) | |
| *B60G 17/015* | (2006.01) | |

(52) U.S. Cl.
CPC ............ *B62D 11/04* (2013.01); *B60C 3/04* (2013.01); *B60C 11/03* (2013.01); *B60G 9/02* (2013.01); *B60G 17/0152* (2013.01); *B60G 17/0162* (2013.01); *B62D 11/003* (2013.01); *B62D 61/10* (2013.01); *B60G 2200/10* (2013.01); *B60G 2500/00* (2013.01); *B60G 2800/21* (2013.01)

(58) Field of Classification Search
CPC ....... B62D 11/00; B62D 11/003; B62D 11/02; B62D 11/04; B62D 61/10; B60G 9/02; B60G 17/0152; B60G 17/0162; B60G 220/10; B60G 2800/21

See application file for complete search history.

(56) References Cited

U.S. PATENT DOCUMENTS

| | | | | |
|---|---|---|---|---|
| 3,299,978 | A * | 1/1967 | Sponsler ................ | B62D 61/12 180/9.52 |
| 4,993,912 | A * | 2/1991 | King ....................... | B25J 5/007 180/8.2 |
| 7,464,775 | B2 * | 12/2008 | Clemens .............. | B60K 7/0007 180/8.1 |
| 10,399,598 | B2 * | 9/2019 | Tanaka .................. | G01S 17/931 |
| 2005/0023052 | A1 * | 2/2005 | Beck .................... | B60K 17/046 180/24.07 |
| 2007/0040341 | A1 * | 2/2007 | Kaloust .............. | B60G 17/0162 280/5.509 |
| 2015/0006005 | A1 * | 1/2015 | Yu .......................... | G06Q 50/28 701/22 |
| 2018/0024554 | A1 | 1/2018 | Brady et al. | |
| 2018/0244327 | A1 | 8/2018 | Liivik et al. | |

FOREIGN PATENT DOCUMENTS

WO    WO2014/070083    *   5/2014

* cited by examiner

*Primary Examiner* — Tony H Winner
(74) *Attorney, Agent, or Firm* — BakerHostetler

(57) ABSTRACT

A skid-steer delivery autonomous ground vehicle has a drive train and suspension that aids in maneuverability. The AGV has six wheels, each of which is powered by its own motor. The AGV has features that diminish the dragging effect on the wheels, either by choice of wheel features or by taking weight off the front wheels during turning.

19 Claims, 5 Drawing Sheets

DRIVE TRAIN AND SUSPENSION FOR AN AUTONOMOUS GROUND VEHICLE

BACKGROUND

The present invention relates to autonomous vehicles, and more particularly to features of a drive train and suspension system for delivery autonomous ground vehicles.

Autonomous ground vehicles are part of the growth of automated devices. One type of autonomous ground vehicle drives over sidewalks and like surfaces for various purposes, including package delivery. In general, delivery AGVs have a control system that regulates voltage of the AGV's motors to control its speed. A six wheeled delivery autonomous ground vehicle is known. Often, AGV are skid-steer type. United States Patent Publication Number 20180244327A1 discloses a six-wheeled vehicle with a "tilting lever" between two wheels.

DETAILED DESCRIPTION OF ILLUSTRATIVE EMBODIMENTS

Figure 1:
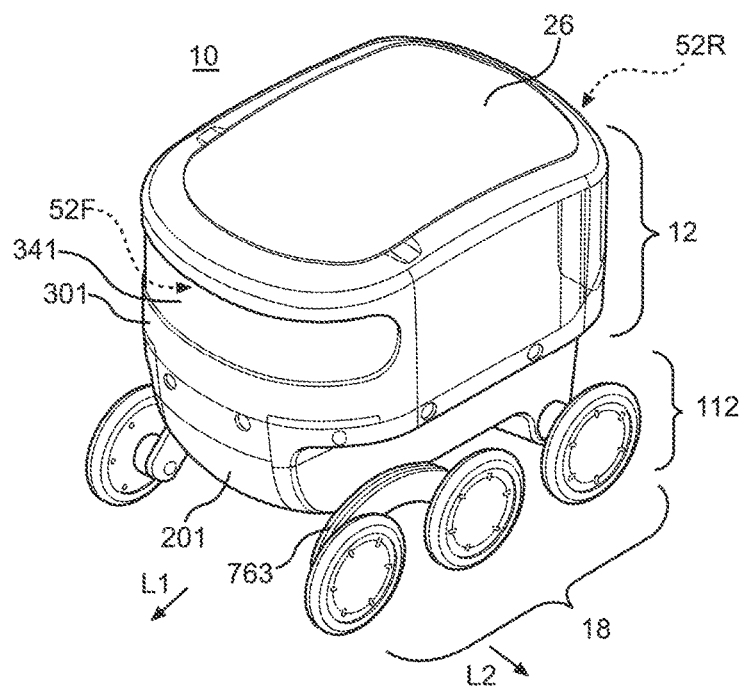
FIG. 1 is a perspective view of a delivery AGV of the type that can employ the braking systems disclosed herein.

An autonomous ground vehicle (AGV) is a category of robot that might operate at times in an unprotected, uncontrolled environment. Because the AGV in some embodiments is intended to deliver packages to a residence and/or business, the delivery AGV must be maneuverable in tight spaces.

In general, an AGV of the type disclosed herein is a ground vehicle (typically unmanned) that operates, at least in some circumstances, without the need for a human controller, and at least at sometimes may operate in unprotected and uncontrolled environment. The AGV may use sensors to develop an understanding of the environment (sometimes only a limited understanding), which is then used by control algorithms to determine the next action to take in the context of a human-provided mission goal.

An AGV, both in general and in the context of a delivery AGV disclosed herein, in an uncontrolled, unprotected environment may have the ability to:

access information about the environment (such as maps of streets, sidewalks, and buildings, and in some cases building interiors);

detect people, obstacles (such as curbs, steps, bumps, slopes, and the like), objects (such as landscaping, gates, and the like), and surfaces (such as lawns, cobblestones, sidewalk cracks and discontinuities, and the like), and then evaluate and take action based on the detection; and travel under its own power to waypoints, usually by battery power and without human navigation assistance, taking into account the above information and detection.

In some circumstances, an AGV's onboard control system may be able to autonomously learn, such as adjusting strategies based on input about the surroundings, adapt to surroundings without outside assistance, and the like.

A particular subset of autonomous ground vehicles is an AGV that navigates to a desired residential or commercial location to carry an object, such as a package containing a commercial product. For example, United States Patent Publication Number 20180024554, titled "Autonomous Ground Vehicles Based At Delivery Locations," which is assigned to the assignee of the present invention, discloses AGVs that retrieve items from transportation vehicles (e.g., delivery trucks) for delivery to specified locations (e.g., user residences, a commercial business, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.). The AGV may also be equipped with a locked lid that can be opened only by an intended recipient.

The present invention uses the phrase "delivery AGV" or "AGV for package delivery" or other combinations of the terms "AGV" and "delivery" to refer to AGVs having the structure, capabilities and function to navigate to a desired location, such as by navigating public or private sidewalks or neighborhoods, to transport a package to a desired customer or residential or commercial location. Accordingly, a delivery AGW includes an internal chamber for holding a package payload and is limited in speed, such as to 6 mph, 10 mph, or 15 mph, as determined by the particular design guidelines and possibly by state regulation. In this regard, these speeds are referred to herein as low speed.

The AGV disclosed herein is driven by six motorized drive wheels. None of the wheels are steered in that each wheel is fixed in a straight-ahead direction. Changing direction is achieved by moderating the wheel speed, according to well-known algorithms. In the embodiment of the figures, the rear wheels are supported by the body of the AGV. The mid-wheels and the front wheels are connected together by a bogie arm connected to the AGV body by a bogie shaft. Other configurations, such as the bogie arm connecting the mid wheels and rear wheels, are possible. The bogie shaft can pivot, and thus the bogie arm can pivot in a see-saw action about the bogie shaft.

Figure 2:
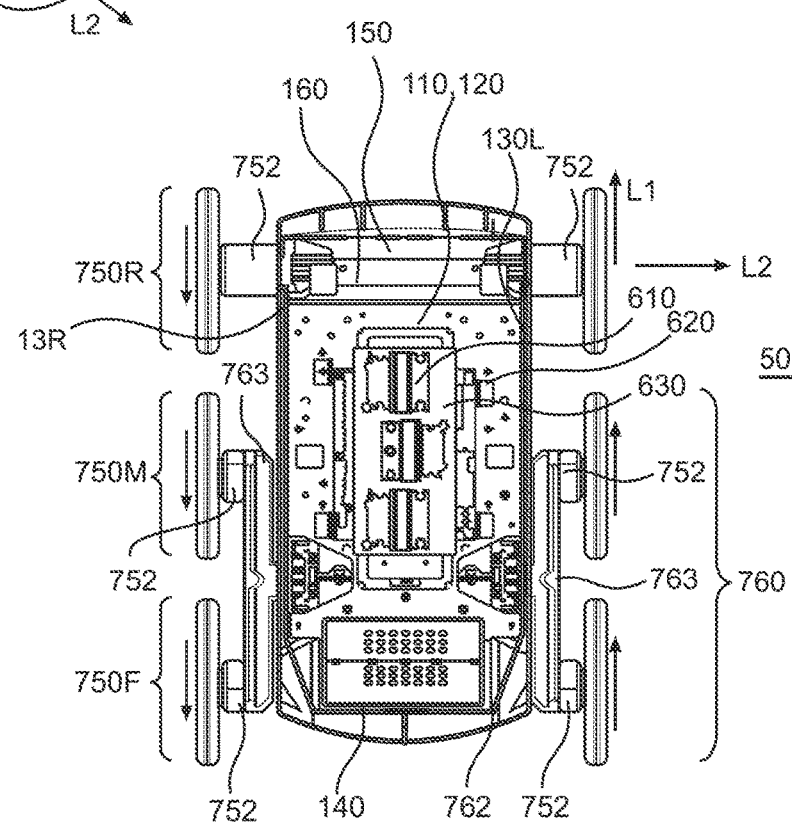
FIG. 2 is a top view with portions of the AGV removed to illustrate the drive system.
Figure 3:
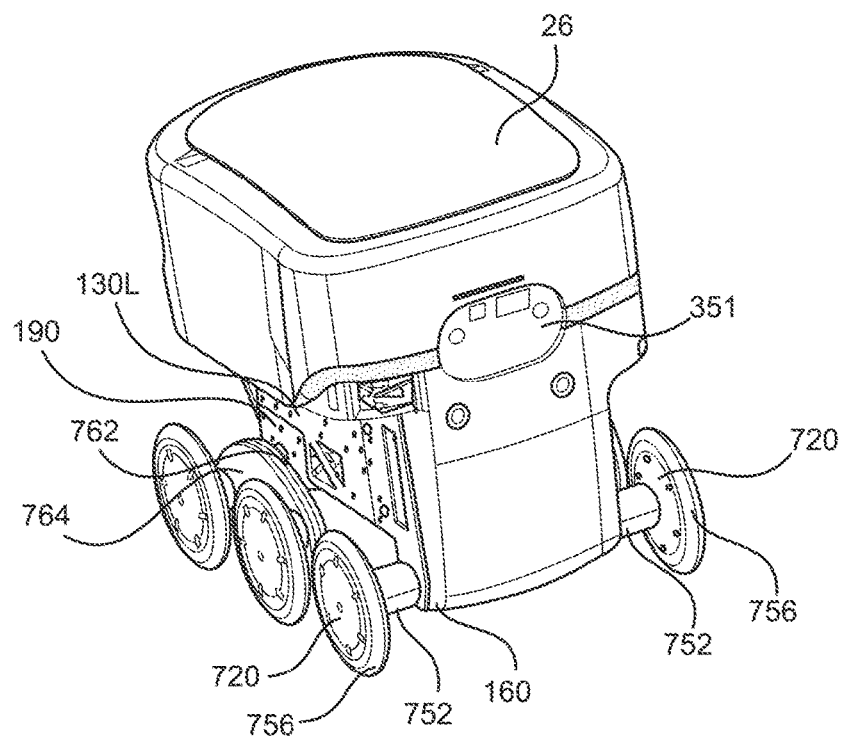
FIG. 3 is another perspective view of the delivery AGV of FIG. 1 with a portion of the shell removed.
Figure 4:
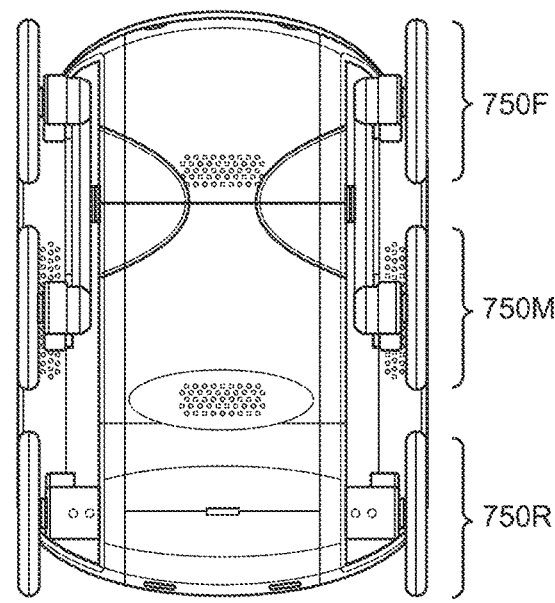
FIG. 4 is a bottom view of the delivery AGV.
Figure 5:
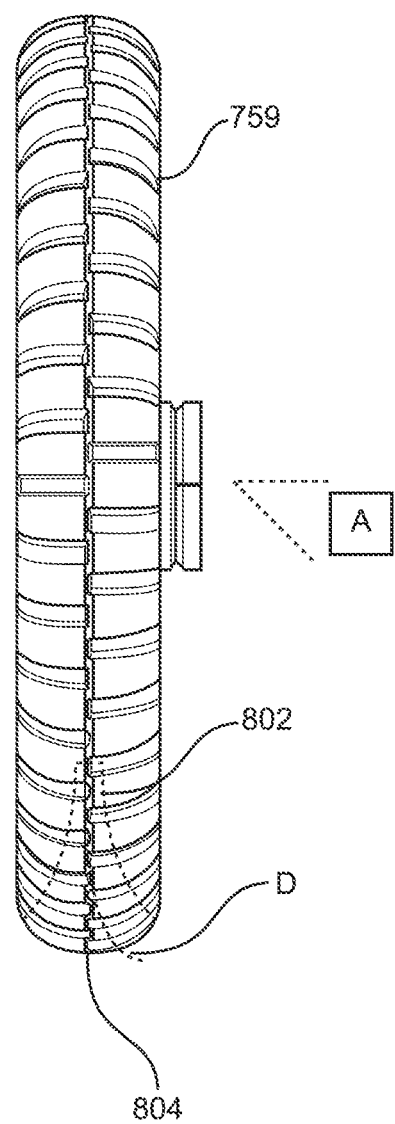
FIG. 5 is an end view of a wheel assembly isolated from other parts, illustrating aspects of a means for reducing dragging.

The AGV has a skid steer system, in which the direction of the drive wheels are fixed in a straight line, as illustrated in FIG. 2. In the example illustrated in FIG. 2, each one of the left wheels is powered by its motor in a forward direction while each one of the right wheels is powered by its motor in a rearward direction. In some circumstances, depending on the location and speed of the wheels, the AGV will pivot about a pivot equidistant between the front and rear wheels. Each one of the front and rear wheels will have a lateral velocity component (that is perpendicular to its front-rear or longitudinal direction) during the process of changing direction such that the wheels skid over the surface. Moreover, in circumstances in which the center or turning is not constant or not aligned relative to the center wheels, the center wheels can also undergo dragging. FIG. 2 illustrates the longitudinal direction L1 and the lateral direction L2. FIG. 5 illustrates wheel deflection, illustrated by a dashed curve line D to represent the deformation of the centerline of a corner tire during dragging.

Dragging of the wheels laterally requires large motor torque from the wheel motors and can cause vibration or chattering that can be transmitted to the body of the AGV, which can be detrimental to electronics. The dragging phenomenon having the drawbacks of large motor torque and/or vibration is referred to herein as dragging. The dragging problem is exacerbated for a delivery AGV that is lightweight to optimize power requirements and that six powered wheels, each of which is non-steered.

The means for diminishing dragging include tire design and diminished the load on the corner wheels, as explained more fully below.

As best illustrated in FIGS. 1-4, a delivery AGV 10 disclosed herein includes an upper body 12, a lower body 112, a wheel and suspension assembly 18, a power supply system, and a control system. Upper body 12 includes a shell 301, a cargo bay 30, front and rear sensors behind corresponding front and rear windows 341 and 351 in the shell, and a lid assembly 26.

Lower body 112 includes a chassis 110 and a skin or shell assembly 201. Chassis 110 in the embodiment of the figures is formed of sheet aluminum plates, including a bottom wall 120, left and right sidewall 130L and 130R, a front wall 140, and a rear wall 150 (bottom wall, right side wall, front wall and rear wall are not shown). The walls are affixed together, such as by rivets or other conventional means, to form a structure that is unitary and capable of supporting AGV 10. Chassis 110 has an open top and forms a hardware bay for a power system, as described below. A processor for overall control and communication functions can be within chassis 110 or proximate front or rear sensors that are located behind front and rear windows 341 and 351, respectively.

A rear portion of bottom wall 120 and a bottom portion or rear wall 150 merge into a transverse structure 160, which forms a lowermost portion of chassis 110 and provides structural support for the rear wheel assemblies. Transverse frame 160 includes structure features forming rear wheel assembly interfaces. A forward portion of chassis 110 includes holes or cutouts forming front wheel assembly interfaces 190, which in the figures is a plate added to side wall 130. For example, a plate of a hub motor can be bolted to the chassis and interfaces 190. Other configurations are contemplated.

The walls of the chassis include structural and functional features that depend on the particular application, including a tapered nose (that is, front walls 140 tapers when viewed in top view), various openings, tabs, structural cross-members, and the like. The walls of chassis 110 can be formed of any material suitable for supporting the panels and wheel assemblies as the AGV carries the intended load. Aluminum sheet metal is used in the embodiment of the figures. The thickness, specific material, use of stiffeners and other structural supports, and other decisions relating to the material choice and properties can be made according to the particular goals of the AGV, including strength, weight, and like parameters.

Shell 201 is formed of overlapping polymer panels held to chassis 100 by fasteners, such as screws. Shell 301 is formed by overlapping polymer panels held to structural columns. The panels of shell 301 overlap the panels of shell 201.

Upper body 12 includes a lockable, hinged lid 26 that covers and secures packages held in a cargo bay (not shown in the figures). Lid 26 preferably is locked in a manner that enables unlocking by the intended recipient by any means locking and opening means.

As illustrated in FIG. 2, the power system includes batteries (not shown), motor controllers 610, voltage regulators 620, power board 630, and other components, as needed, to supply and regulate power to the drive wheel assemblies.

Wheel and suspension assembly 18 includes three pairs of drive wheels assemblies: rear drive wheel assemblies 750R, mid drive wheel assemblies 750M, and front drive wheel assemblies 750F. As illustrated in the figures, rear drive wheel assemblies 750R are supported by transverse frame 160 of the chassis at wheel interface 190. Mid and front wheel assemblies 750M and 750F and connected via a bogie system 760. The bogie mechanism 760 includes an axle or shaft 762 and a bogie arm 764 coupled to an outboard end of shaft 762. Shaft 762 extends through skin 201 and is supported at the front wheel interface 190 of chassis 110. Bogie arm 764 pivots relative to a centerline of shaft 762. The structure disclosed herein is not limited to a fixed shaft 762 on which arm 764 pivots, or a pivoting shaft 762 to which arm 764 is rigidly attached or pivotable, or other configuration unless specified in the claim.

Consistent with the convention throughout the description, reference number 750 is used to refer to structure common to all wheel assemblies. Each one of drive wheel assemblies 750 includes a hub-type drive motor 752, which preferably is conventional, and a wheel 754 powered by drive motor 752.

Each wheel 754 includes a tire 756 and a disc 720 that is affixed to the rotor or output shaft of the drive motor 752 and the tire 756. Tire 756 preferably is formed of a solid rubber, a polymer, or like material. A common process is injection molding or over-molding the tire material on a polymer disc, such as disk 720.

AGV 10 includes a means for diminishing dragging. The means for diminishing dragging may include tread of tire 756 chosen to diminish dragging. The tread pattern can affect friction and the propensity for dragging. A tread 759, an example of which is illustrated in FIG. 5, includes grooves or channels. To diminish dragging, generally, a tire tread can include various components. For the example shown in FIG. 5, a tire tread that only has grooves parallel to the axis of rotation of the tire may be employed. Further, grooves that are neither parallel to the axis of tire rotation nor parallel with the direction of straight-ahead movement L1 of the tire (which is perpendicular to the tire rotation axis L2) are referred to herein as "oblique." Oblique tread components are illustrated schematically by an angle A of FIG. 5. Treads having an oblique component are contemplated.

The force applied by the ground to the tire at the groove when the AGV is undergoing turning in a skid steer configuration (that is, the force in direction L2 that in skid steer systems causes dragging), can include (depending on the circumstances) a force component in the straight-ahead direction L1 such that the force rotates the tire, thereby diminishing dragging. In this regard, as the tire encounters dragging conditions, some of the force applied in the direction L2 is transmitted to by the surface of the tread 759 (such as but not limited to oblique tread components) into a force that tends to rotate tire 756, which relieves the energy build up that can cause dragging. Tire 756 can have a thinned portion 802 radially inboard to the contact portion 804 of tread 759 to diminish dragging. This configuration is referred to herein as mushroom-shaped, which shape is believed to diminish the magnitude of dragging.

The means for diminishing dragging can also include a tire material that diminishes vibration when undergoing dragging. The tires 756 of the AGV can be solid tires, which often have a durometer of at least shore 65A. Preferably, the tires 756 are formed of a material having a durometer of no more than 60A, or no more than shore 50A, and more preferably no more than shore 40A. Further, layers of different materials having different durometers to diminish vibration likelihood, vibration amplitude, and/or vibration frequency may be employed. The exact stiffness chosen for the tire material depends on the geometry of the tire, as the values provided herein are for example or illustration.

The tire features for diminishing dragging may be applied to any of the tires 756 of rear, mid, and front wheels 750R, 750M, and 750R. The corner wheels 750R and 750F are expected to encounter greater dragging than mid wheels 750M, and thus is possible that the tire features described herein are applied only to front wheels 750F, only to corner wheels 750R and 750F, only rear wheels 750R, or all wheels 750R, 750M, and 750F.

The means for diminishing dragging can also include diminishing the load on the corner wheels that are in position to experience dragging. In some embodiments, the load on a first one of the corner drive wheels (that is, either the front drive wheel 750F or rear drive wheel 750R that is attached to bogie arm 764 opposite to mid drive wheel 750M) is diminished by transferring load from the first drive wheel to mid drive wheel 750M. The effect of increased load on mid drive wheel 750M in most circumstances reduces the load on all corner wheels 750R and 750F. Accordingly, the structures and functions in this regard are referred to a means for diminishing the load on the corner wheels.

Figure 6:
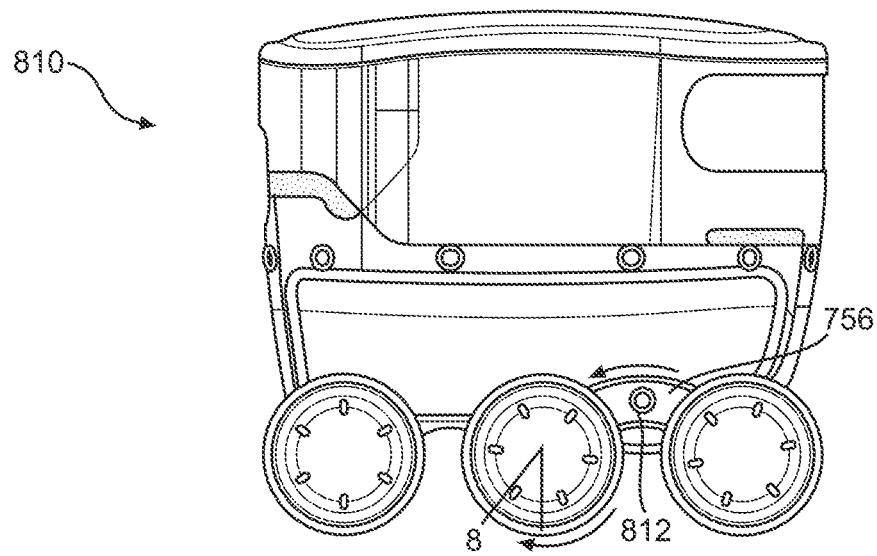
FIG. 6 is a side view of the delivery AGV illustrating another aspect of a means for reducing dragging.
Figure 7:
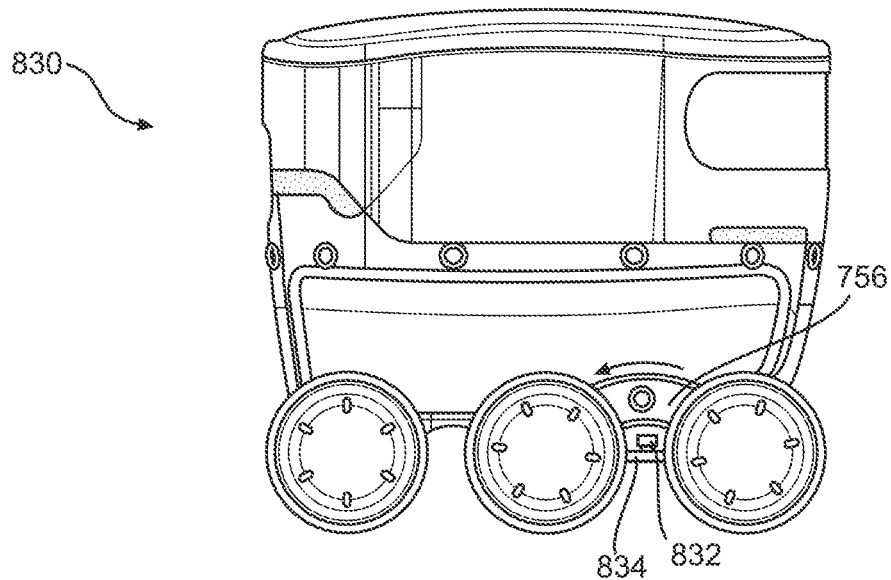
FIG. 7 is another side view of the delivery AGV illustrating another aspect of a means for reducing dragging.

According to a first embodiment drag diminishing system 810 illustrated in FIG. 6, a motor control reduces the load on the front wheels 750F, while AV is at rest, rotating the mid drive wheel 750M by an angle delta while the rear wheels 750R are fixed. In the side view of FIG. 6, the clockwise rotation of mid wheel 750M puts load on mid wheel 750M and on rear wheel 750R while reducing load on front wheel 750F.

Drag diminishing system 810 may also function while AGV is in motion. For example, when AGV 10 is moving forward, the controls can increase mid drive wheel 750M speed relative to front wheels 750F. The acceleration of mid drive wheels 750M during this process reduces the load on front wheels 750F, as illustrated by the arrow indicating a moment applied about bogie shaft 762 in FIG. 6.

System 810 may include one or more sensors to indicate the functioning of the drag diminishing system. An encoder 812 may be located at shaft 754 to indicate the position of bogie arm 764. Other sensors (not shown) may be employed, such as load cells to indicate load on each wheel assembly, accelerometers, and the like.

System 810 relies on the differential in rotational position of the middle and rear wheels relative to the front wheels, the load of front wheel 750F on the ground is diminished. In some circumstances, the middle wheel rotational position is slightly ahead of the nominal position of the nominal rear wheel position in order to diminish the front wheel load. System 810 can work with a mechanical lock, as explained below.

System 830 for diminishing dragging reduces load on front wheel 750F by mechanical means. For example, a spring 832 or other means (not shown) can provide an upward force on wheel 750F or a portion of bogie arm 764 forward of shaft 754. Alternatively, spring 832 of other means could put a downward force on bogie arm 764 rearward of shaft 754. Spring 832 can be placed at any position such that the spring imparts and upward force on wheel 750F. For merely one example, a bracket 834 can extend laterally from chassis 110 beneath the front portion of bogie arm 764 such that spring 832 is between bracket 834 and the underside of bogie arm 764. Spring 832 in compression then applies an upward force on the forward portion of bogie arm 764.

Spring 832 can include a release such that the upward force is applied only when turning, and can be disengaged when moving forward and/or when curb climbing or stair climbing. In this regard, bracket 834 can be translated up and down to engage and disengage, respectively, spring 832. Or bracket 834 could be pivoted down to release the force applied to the forward portion of arm 756 (that is, disengage the spring) and then be pivoted upwardly into position to enable spring 832 to apply the upward force (that is, engage the spring).

Other mechanical means are contemplated. For example, a releasable torsion spring can be applied to the shaft 765 of mid drive wheel 750M and/or front drive wheel 750F to apply the downward force on front wheel 750 when desired. The orientation of the torsion spring on front wheel 750F is opposite the orientation of the torsion spring on mid wheel 750M. Further, an actuator may replace the spring. For example, an electric linear actuator may be used in place of or in addition to spring 832. For example a screw type actuator, a solenoid, and the like can be used to create the upward force described above. Pneumatic, hydraulic, other conventional linear actuators may be employed.

Figure 8:
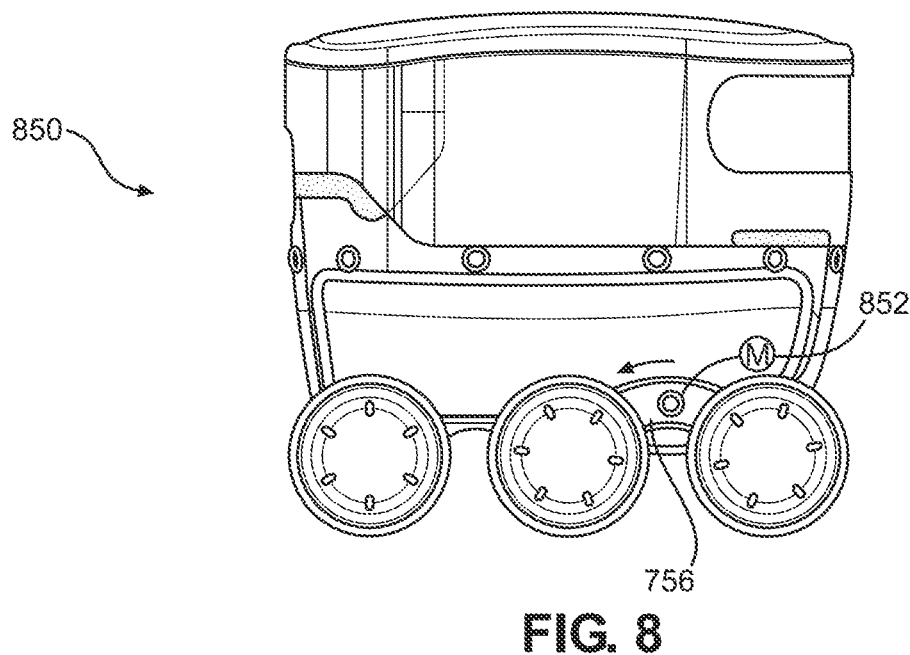
FIG. 8 is another side view of the delivery AGV illustrating another aspect of a means for reducing dragging.

A third means 850 for diminishing front wheel dragging includes a motor 852 mounted such that it drives bogie arm 764 to apply a torque on bogie arm 764, and thus increase load on mid wheel 750M (counterclockwise in FIG. 8) and reduce the load on front wheel 750F. Motor 852 can be any type, such as a servomotor or stepper motor, or other. Motor 852 is controlled by the control system such that it may be disengaged (that is, turned off) during normal operation and engaged to diminish to load on front wheel 750F when desired. An encoder on the motor 852 or bogie arm 764 may be employed.

Figure 9:
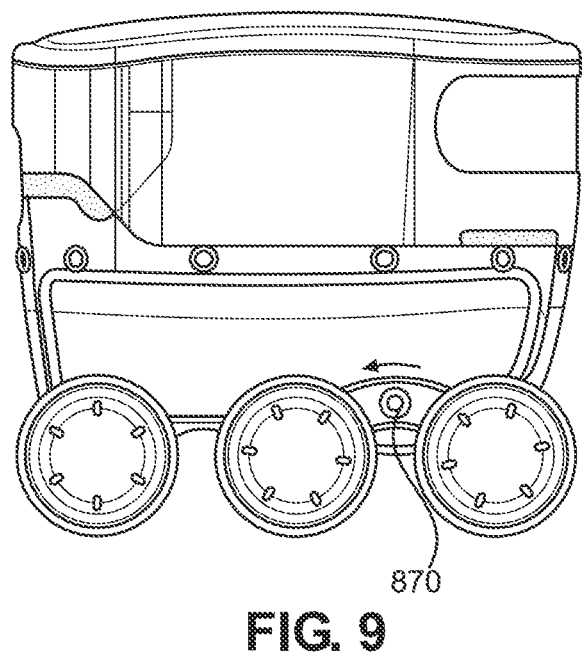
FIG. 9 is another side view of the delivery AGV illustrating another aspect of a means for reducing dragging.

AGV 10 can include a lock 850 that holds bogie arm 764 in position upon front wheel 750F having a diminished load. The lock can be a mechanical lock or clamp can be of any type, as any of the many commercial clamps based on friction, detents, and the like may be employed. Lock 870 is illustrated schematically in FIG. 9 to indicate its use. Lock 870 may be employed anywhere convenient, and may be actuated by an electric actuator associate with the type of mechanical lock, and preferably is a solenoid or solenoid controlled.

Lock 870 may be employed with any of the means for diminishing dragging disclosed herein, such as means 810, 830, and/or 850. For example, the load on front wheel 750F may be diminished by means 810, 830, and/or 850, and lock 870 may be employed to hold bogie arm 764 in the position in which the load to front wheel 750F is diminished.

In practice, any and all of the tire design features and means for diminishing dragging may be employed in any combination. As an example of the operation of AGV 10, upon a determination from the control system or from a remote control that AGV 10 should turn or pivot, drive the wheels on one side of the AGV can rotate one direction (forward or rearward) while the wheels on the other side of the AGV operation in the other direction (rearward or forward, respectively). The speed of the drive wheels can be moderated to diminish dragging of rear wheels 750R, relying on the dragging reducing mechanisms disclosed herein to reduce dragging of front wheel 750F.

Upon application of an upward force (that is, a diminished load) on front wheels 750F, lock 870 may engage to hold front wheel 750F and bogie arm 764 in a position in which some of the load normally on front wheel 750F is transferred to mid wheel 750M. The reduced load on front wheel 750F and the dragging diminishing tire design are believed to improve or eliminate vibration and undue drag forces at front wheel 750F.

The control algorithms for controlling the straight-ahead movement, turning, and rotating AGV 10 are well known, as will be understood and employed by persons familiar with battery powered vehicles.

Control system 50 includes sensors 52F and 52R and other components and systems used for navigation and guidance, avoiding objects, image-capture and sensing, power management, communications, security, and other functions inherent in achieving the goals of a delivery AGV. Sensors 52F and 52R can be mounted behind a forward facing panel 341 and/or a rearward facing panel 351. Sensors 60 can include cameras having images sensors including image signal processing, light sensors, and the like, with corresponding processing including image decoding, lens correction, geometrical transformation, video stream transcoding, video analytics, image capture, and compression to provide obstacle detection and obstacle identification. Sensors for determining speed may also be employed. Panel 28F (and 28R) can be transparent polymer, such as (for example) acrylic, Plexiglas, or polycarbonate.

Sensors 52F and 52R can include RADAR sensors, such as SRR (Short-range radar) applications and MRR/LRR (mid-range radar, long-range radar) applications; LIDAR sensors, such as infrared LIDAR systems that with the aid of a Micro-Electro-Mechanical System (MEMS), which use a rotating laser, or a solid-state LIDAR. Control system 50 can also include GPS modules, inertial guidance modules such as an inertial measurement unit (IMU) having gyroscopes and accelerometers (preferably in each of the x, y, and z directions), power management modules to control power, overall consumption, and thermal dissipation. Other modules, components and functions are contemplated.

Control system 50 and sensors 52F and 52R may also be employed in controlling the driving and turning of AGV 10 during normal conditions. For example, a speed sensor on the wheels, sensors on motor current and/or voltage, GPS, accelerometer, gyroscope, optical sensors, and the like may be employed to determine a safe straight-ahead speed, safe turning radius and velocity for the vehicle and package (taking into account the possibility of encountering a person who might not see or be expecting the vehicle), safe stopping distance to provide feedback to the controller for determining the speed, and the like.

Control system 50 may also include a package delivery module and corresponding sensors. For example, a sensor can be associated with a closed position of lid 26 to assure that a package to be delivered to a residential or commercial destination is secure in chamber 24 during transport. A means for unlocking a lock on lid 26 (or unlocking an actuator for lid 26 or like means) can include a keypad, a wireless communication system (for working with Wi-Fi, cellular data, Bluetooth, NFC or other communication means to send a signal to the lock upon verification), a facial or fingerprint recognition module, or the like may also be included.

Control system 50 controls the movement of AGV 10 to a desired destination, the delivery of a package within chamber 24 to an authorized recipient, and/or movement of AGV 10 to a home location. In this regard, the description of control system 50 and sensors 52F and 52R, and United States Patent Publication Number 20180024554 and/or industry practice in view of the present disclosure may inform the functions in this regard.

It is, of course, the goal of control system 50 to avoid unintentional contact, especially for people, pets, and the like. Contact is referred to herein as transient contact to distinguish it from intentional, low-force contact (such as opening the lid to access a package) and contact over a significant period, such as leaning against or placing a foot on the robot, of the type that is not a risk, or is a low risk, of injuring a person. In the event of transient contact, the energy absorbing means disclosed herein are intended to diminish the magnitude of energy transmitted to a person by an AGV, compared with an unmodified solid or rigid surface of prior art AGVs currently commercialized.

The present invention has been illustrated by using examples of possible embodiments. The present invention is not limited to the structure, function, and/or materials set out herein. Rather, it is intended that the invention be given its broadest appropriate scope.

We claim:

1. A skid-steer delivery autonomous ground vehicle (AGV) having a drive and suspension system, the delivery AGV comprising:
    two pairs of opposing independent corner drive wheels coupled to a chassis of the AGV;
    a pair of opposing mid drive wheels;
    a bogie suspension on each side of the body connected to the chassis and connected between the mid drive wheels and a first one of the pairs of drive wheels; and
    means for diminishing dragging of at least one of the corner drive wheels during turning, the means for diminishing dragging including at least one of tire configuration features and a means for diminishing a load on the corner drive wheels while the AGV is at rest.

2. The AGV of claim 1 wherein the bogie suspension includes a pivotable bogie shaft connected to a chassis of the body of the AGV and a bogie arm at a distal end of the bogie shaft, the mid drive wheel coupled to a first end of the bogie arm, the first one of the corner wheels coupled to an opposing end of the bogie arm, the first one of the corner wheels being one of the front drive wheel and the rear drive wheel.

3. The AGV of claim 2 wherein the means for diminishing dragging is a tire with a tread that reduces dragging, wherein the tread includes components parallel to an axis of rotation.

4. The AGV of claim 3 wherein the tire has a durometer chosen to diminish dragging and based on a tire geometry.

5. The AGV of claim 3 wherein the means for diminishing dragging is the tire having a mushroom shaped cross section.

6. The AGV of claim 3 wherein the means for diminishing dragging includes a means for diminishing the load on the corner drive wheels relative to a load on the mid drive wheels while the AGV is at rest.

7. The AGV of claim 6 wherein the means for diminishing the load on the corner drive wheels includes a control system adapted for rotating the mid drive wheel relative to the first drive wheel such that the load on the first drive wheel is reduced.

8. The AGV of claim 6 wherein the means for diminishing the load on the corner drive wheels includes a biasing mechanism for applying a force to the bogie arm in an orientation to produce an upward on the first drive wheel.

9. The AGV of claim 7 wherein the biasing mechanism is releasable, whereby the biasing mechanism is adapted for releasing the force applied to the first drive wheel.

10. The AGV of claim 6 wherein the means for diminishing load on the corner drive wheels includes a motor adapted for providing a torque to the bogie arm in an orientation that applies an upward force to the first drive wheel.

11. The AGV of claim 6 wherein the means for diminishing load on the corner drive wheels includes a means for applying an upward force to the first drive wheel and a lock adapted for holding the first drive wheel in a diminished load state.

12. The AGV of claim 2 wherein the bogie suspension is connected between the mid drive wheel and the front drive wheel, and the bogie arm is coupled to the mid drive wheel and the front drive wheel.

13. A delivery autonomous ground vehicle (AGV) having a drive and suspension system, the delivery AGV comprising:
 a body for carrying a package;
 six motorized, skid steer drive wheels; the six drive wheels including, on opposing sides of the body: two pairs of corner drive wheels and a pair of mid drive wheels between the corner drive wheels;
 a bogie suspension on each side of the body connected between the mid-wheel and at least a first one of the corner wheels; and
 means for diminishing dragging of at least one of the corner drive wheels.

14. A method of operating a delivery autonomous guided vehicle comprising:
 in a delivery AGV of claim 13, providing power to the drive wheels such that the AGV undergoes a tight turn; and
 diminishing dragging on the corner drive wheels by engaging a means for diminishing a load on the corner drive wheels.

15. The method of claim 14 further including the step of diminishing dragging by rotating a tire via tire configuration features during the tight turn.

16. The method of claim 14 further including the step of engaging a lock to hold the means for diminishing the load in an engaged position.

17. The method of claim 16 wherein step of diminishing the load on the corner drive wheels includes rotating the mid drive wheel relative to the first drive wheel such that the load on the first drive wheel is reduced.

18. The method of claim 16 wherein step of diminishing the load on the corner drive wheels includes applying a biasing force to a bogie arm in an orientation to produce an upward force to the first drive wheel.

19. The method of claim 16 wherein step of diminishing the load on the corner drive wheels includes providing a torque to the bogie arm in an orientation that applies an upward force to the first drive wheel.

\* \* \* \* \*